United States Patent
Sherratt et al.

(10) Patent No.: US 7,200,216 B2
(45) Date of Patent: Apr. 3, 2007

(54) CALL DISTRIBUTION

(75) Inventors: Robert P Sherratt, Felixstowe (GB); Gerry Simblett, Felixstowe (GB)

(73) Assignee: British Telecommunications public limited company, London (GB)

( * ) Notice: Subject to any disclaimer, the term of this patent is extended or adjusted under 35 U.S.C. 154(b) by 151 days.

(21) Appl. No.: 10/433,458

(22) PCT Filed: Dec. 17, 2001

(86) PCT No.: PCT/GB01/05579

§ 371 (c)(1), (2), (4) Date: Jun. 3, 2003

(87) PCT Pub. No.: WO02/51113

PCT Pub. Date: Jun. 27, 2002

(65) Prior Publication Data

US 2004/0052353 A1    Mar. 18, 2004

(30) Foreign Application Priority Data

Dec. 19, 2000   (EP)   .................. 00311399

(51) Int. Cl.
*H04M 7/00* (2006.01)
*H04M 11/00* (2006.01)

(52) U.S. Cl. .............. 379/220.01; 379/93.17; 379/221.08; 379/229

(58) Field of Classification Search ........... 370/252; 379/221.14, 265.02, 220.01, 221.08, 229, 379/93.17; 709/202
See application file for complete search history.

(56) References Cited

U.S. PATENT DOCUMENTS

| 5,590,188 | A | * | 12/1996 | Crockett ............. 379/265.02 |
| 5,768,358 | A | * | 6/1998 | Venier et al. ........ 379/221.14 |
| 5,982,870 | A | * | 11/1999 | Pershan et al. ....... 379/221.08 |
| 6,023,505 | A | * | 2/2000 | Moquin ............... 379/229 |
| 6,163,597 | A | * | 12/2000 | Voit ................ 379/93.17 |
| 6,366,658 | B1 | * | 4/2002 | Bjornberg et al. .... 379/221.08 |
| 6,477,563 | B1 | * | 11/2002 | Kawamura et al. ...... 709/202 |
| 6,611,498 | B1 | * | 8/2003 | Baker et al. ............ 370/252 |
| 6,662,207 | B2 | * | 12/2003 | Kawamura et al. ...... 709/202 |

FOREIGN PATENT DOCUMENTS

| EP | 0948182 A1 | 10/1999 |
| WO | WO 99/30513 | 6/1999 |
| WO | WO 00/10342 | 2/2000 |
| WO | WO 02/51113 A1 | 6/2002 |

OTHER PUBLICATIONS

International Preliminary Examination Report.

* cited by examiner

*Primary Examiner*—Wing Chan
*Assistant Examiner*—Thjuan P. Knowlin
(74) *Attorney, Agent, or Firm*—Nixon & Vanderhye P.C.

(57) ABSTRACT

A service management system and/or method allows call distribution using a call plan to be executed using several service execution platforms from different manufacturers, which may be associated with different network types.

6 Claims, 10 Drawing Sheets

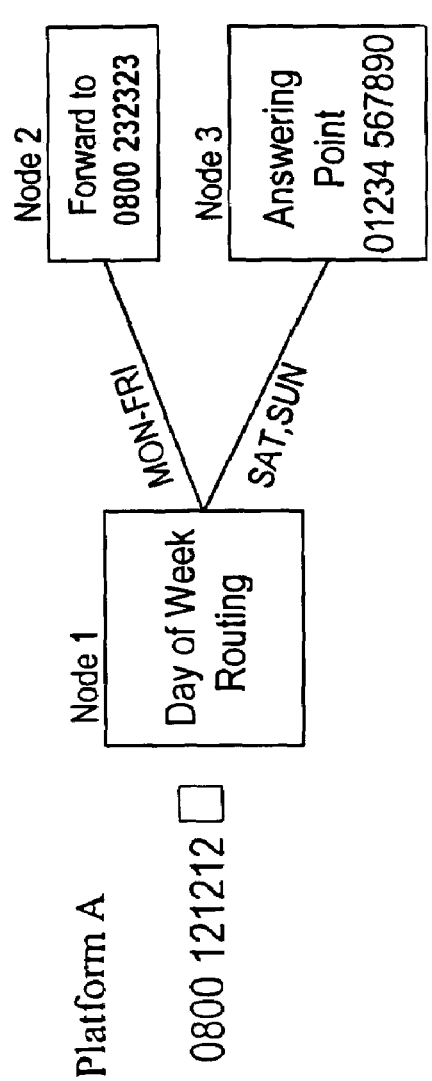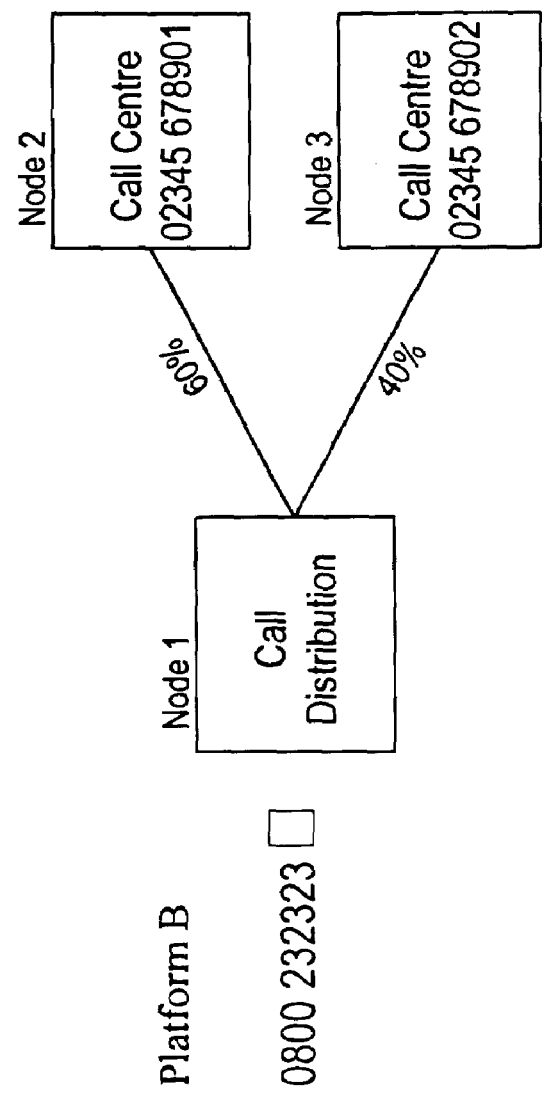

| 0800 121212 | | |
|---|---|---|
| Call Date | Effective Calls | Lost Calls |
| 23 Nov 00 | 12 | 2 |
| 24 Nov 00 | 15 | 3 |
| 25 Nov 00 | 27 | 5 |

Figure 8a

| 0800 232323 | | |
|---|---|---|
| Call Date | Effective Calls | Lost Calls |
| 23 Nov 00 | 7 | 0 |
| 24 Nov 00 | 9 | 1 |
| 25 Nov 00 | 4 | 2 |

Figure 8b

| 0800 121212 | | |
|---|---|---|
| Call Date | Effective Calls | Lost Calls |
| 23 Nov 00 | 12 | 2 |
| 24 Nov 00 | 15 | 4 |
| 25 Nov 00 | 27 | 7 |

Figure 8c

CALL DISTRIBUTION

This application is the US national phase of international application PCT/GB01/05579 filed 17 Dec. 2001 which designated the U.S.

BACKGROUND

1. Technical Field

The present invention relates to call distribution in a communications network, in particular for telemarketing services.

2. Related Art

Telemarketing services involve, for example, a retailer operating a call answering centre in which a number of call answering agents take calls from customers. Large call answering centres may be split over several sites and may employ some hundreds of call answering agents. Typically, customers dial a single number, which may be charged at a particular rate, for example, the rate applicable to a local call, and each call is automatically directed within the network to an appropriate one of the sites, and subsequently to one of the call answering agents within the site. The system which is responsible for distributing the calls between different sites may use a call plan. A call plan comprises a decision tree which is pre-programmed with criteria to be used in selecting a destination. For example, one criterion might be the time of day at which the call is made, with out-of-hours calls all being directed to one particular site, a particular ratio of calls may be directed to different sites or calls may be directed to a particular site in dependence upon the geographical origin of the call.

Intelligent network platforms capable of providing such distribution of calls are provided by many equipment suppliers. Each equipment supplier usually provides a support system for their particular platform. Such support systems typically provide facilities such as call plan editing and reporting facilities so that a customer can monitor call completion performance, for example, and geographic mapping of calling line identities.

In order to provide all the services required by a particular customer a telecommunications operator (also referred to herein as the service provider) may provide services using a plurality of service execution platforms. The problem with this approach is that instead of having a single virtual network the customer then has to partition their virtual network into a plurality of virtual networks each associated with one of a plurality of service execution platforms. In addition to this the customer is faced with having to design several call plans using different interfaces and editors. This results in data duplication and re-entry and thus errors are likely to occur. Also reporting facilities are not integrated so the customer receives several different types of reports.

BRIEF SUMMARY

According to an exemplary embodiment of the present invention there is provided a service management system for implementing a call plan using a plurality of service facilities suitable for use in a communications network comprising: a plurality of rules describing how a plurality of service facilities maps on to a plurality of service execution platforms; a processor for partitioning the call plan into a plurality of call plan segments in dependence upon said rules, each call plan segment using service facilities supported by a single service platform; adding an interplatform routing node to said call plan segments, the routing node causing transfer of calls from one service platform to another service platform; and transferring the call plan segments to the service execution platform upon which those facilities are supported.

Preferably the interplatform routing node causes a call to be forwarded from a first service platform to a non-geographic number associated with a second service execution platform.

The service management system may further comprise a report manager for providing a consolidated report relating to call statistics for a plurality of service execution platforms.

According to a second aspect of the invention there is provided a method of partitioning a call plan into call plan segments in which a call plan comprises a plurality of service facilities, resulting in an incoming call being routed to one of a plurality of endpoints, and in which each service facility is associated with a service execution platform, and in which each endpoint is associated with a service execution platform; the method comprising the steps of constructing a plurality of call plan segments comprising contiguous service facilities associated with each particular service platform; adding an interplatform routing node between each pair of contiguous service facilities where one service facility of such a pair is associated with a first platform and the other service facility of that pair is associated with a second platform; and adding an interplatform routing node between each service facility associated with a first platform which routes the call to an endpoint associated with a second platform node.

Preferably the interplatform routing node causes a call to be forwarded from a first service platform to a non-geographic number associated with a second service execution platform.

According to a third aspect of the invention there is also provided a method of consolidating call statistic reports from a plurality of service execution platforms, a call statistic report comprising a plurality of entries relating to a time interval, each entry comprising an effective call count and an lost call count, the method comprising the steps of determining a consolidated effective call count being equal to the maximum effective call count in the plurality of call statistic reports for a given time interval; and determining a consolidated lost call count being equal to the sum of the lost call count in the plurality of call statistic reports for said time interval.

According to another aspect of the invention there is provided a method of call 20 routing comprising the steps of receiving a call; routing the call according to a call plan segment associated with a first service execution platform; forwarding the call to a second service execution platform; and routing the call according to a second call plan segment associated with the second service execution platform.

BRIEF DESCRIPTION OF THE DRAWINGS

Systems embodying the present invention will now be described in detail, by way of example only, with reference to the accompanying drawings in which:

FIG. 7 illustrates the call plan segments of FIG. 5 as they would be implemented upon two separate service execution platforms;

FIGS. 8a and 8b show reports from two service execution platforms, and FIG. 8c shows a resulting merged call plan.

DETAILED DESCRIPTION OF EXEMPLARY EMBODIMENTS

Figure 1:
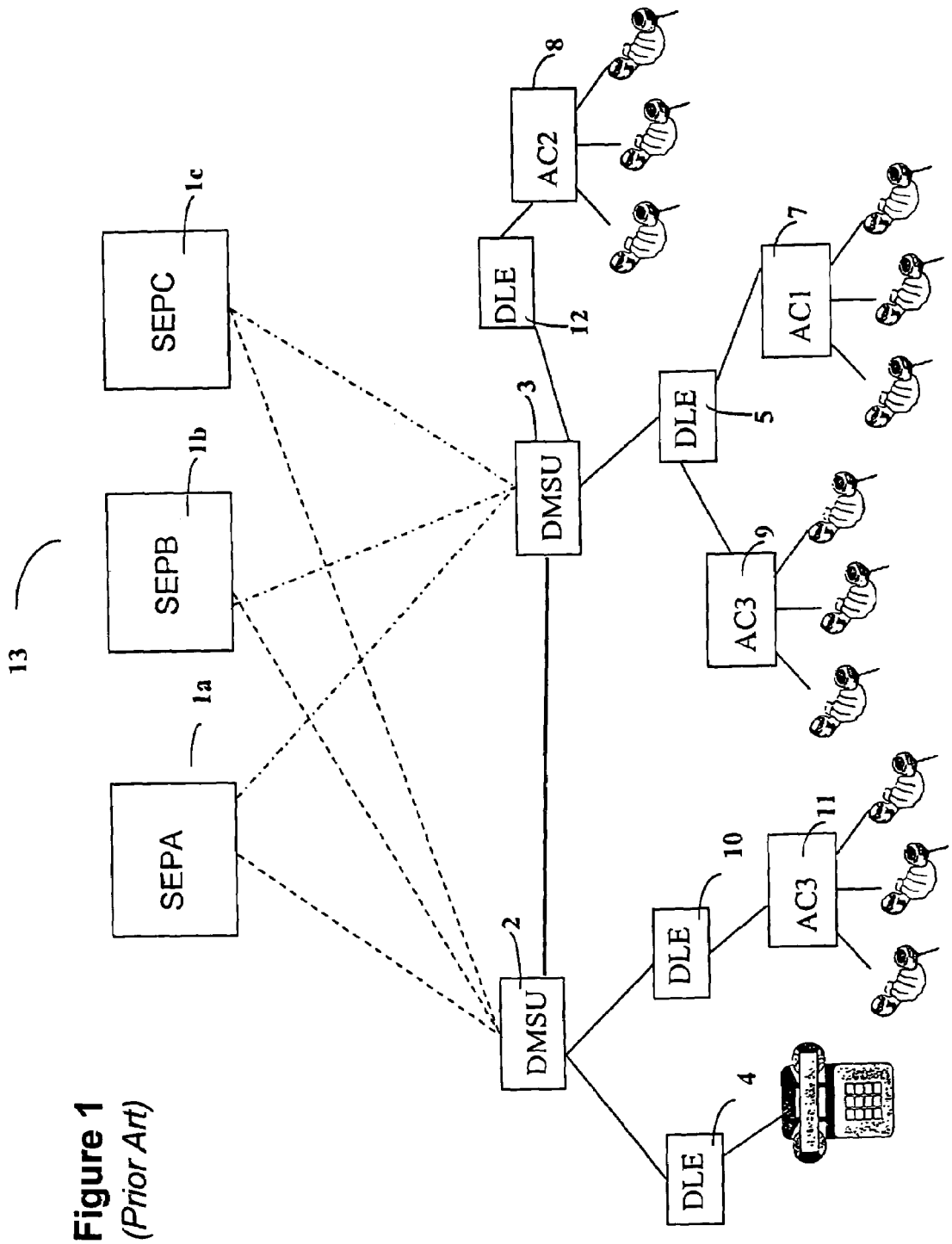
FIG. 1 is a schematic illustration of a telecommunications network.

FIG. 1 illustrates a telecommunications network 13 which uses an IN (Intelligent Network) architecture includes a plurality of intelligent network platforms 1a, 1b, 1c, also referred to herein as service execution platforms. Examples of these are the Cisco Intelligent Call Manager, the Marconi Phoenix Intelligent Network System, the BT Network Intelligence Platform, and the MCI WorldCom Distributed Applications Platform. The intelligent network platforms 1a, 1b, 1c are connected to trunk digital main switching units (DMSU's) 2, 3 and to digital local exchanges (DLE's) 4, 5. At certain points during the progress of a call, the DMSU's and DLE's transfer control of the call to an intelligent network platform 1a, 1b or 1c. The intelligent network platforms carry out functions such as number translation and provide a gateway to additional resources, for example to a voice messaging platform. In the present example, the intelligent network platforms 1a, 1b, 1c are arranged to use a call plan to direct calls made to a particular number to one of a plurality of answering centres 7, 8, 9, 11 at different sites. In other embodiments of the invention the service execution platform may comprise a soft switch such as the NetCentrex or Nortel system for use with voice over IP networks. The telecommunications network may span continents and the answering centres 7, 8, 9, 11 may be in different countries.

Figure 2:
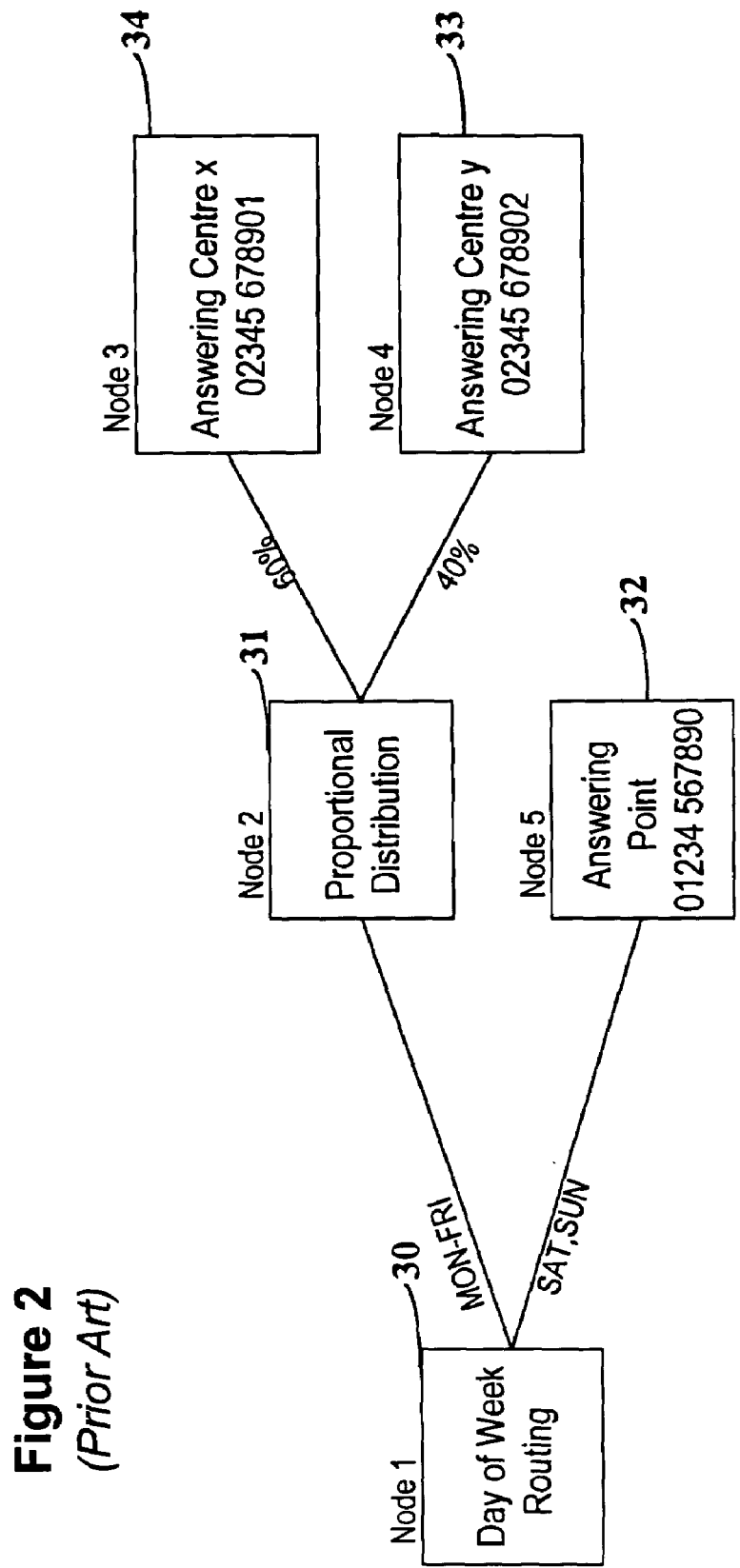
FIG. 2 is an illustration of a call plan.

FIG. 2 illustrates a simple call plan in which a day of week based routing node 30 causes a call to be routed to a particular answering point 32, for example a message service or an answering centre which operates at weekends, if the call is made on a Saturday or a Sunday. If the call is made during Monday to Friday then the call is processed according to a proportional distribution node 31 which causes 60% of calls to be routed to one answering centre x 34, and 40% of calls to be routed to another answering centre y 33. Nodes which result in the call being routed to a particular destination, such as answering point 32 and call centres 34, 33 are referred to in the description as endpoints.

Figure 3:
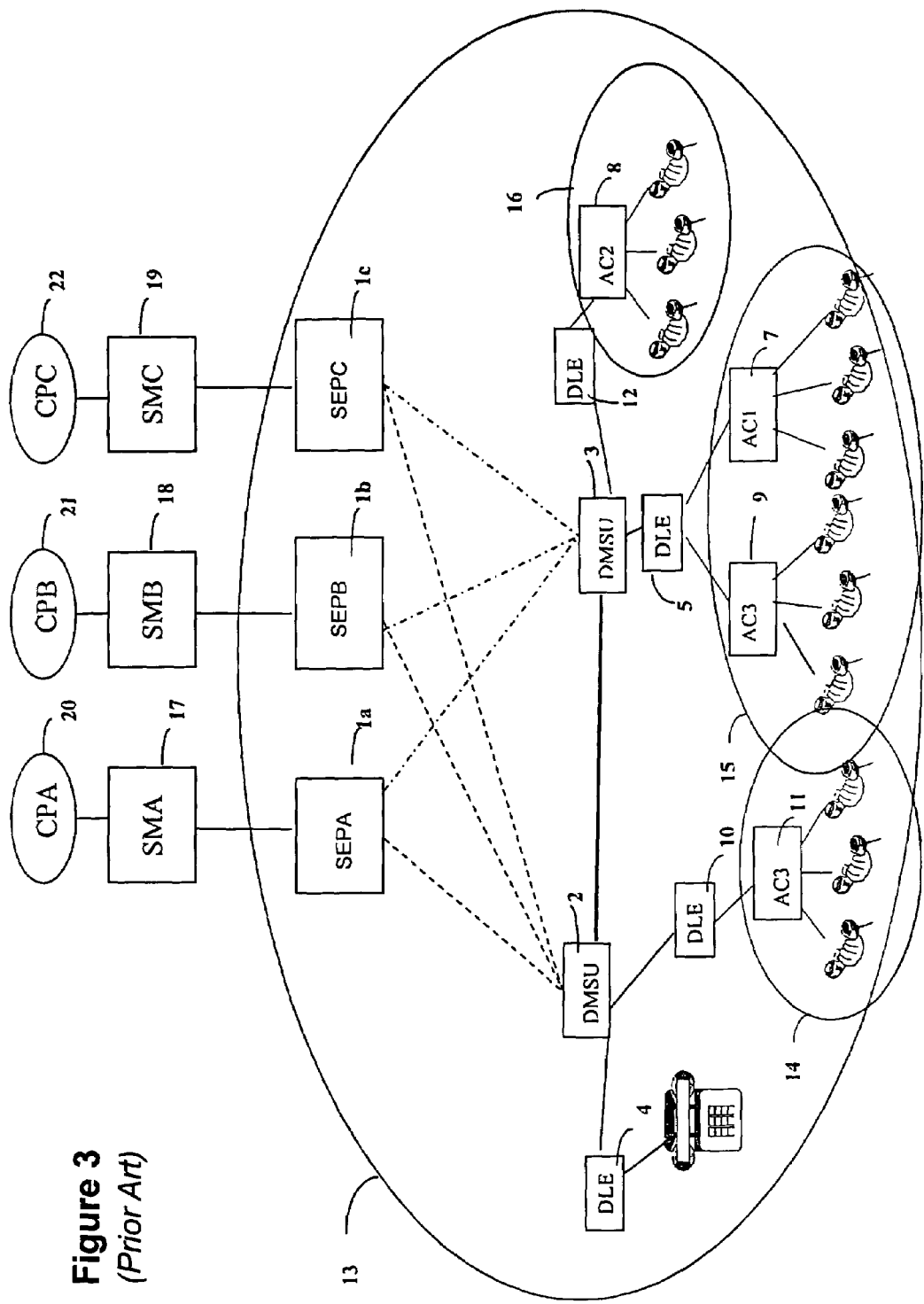
FIG. 3 illustrates a telecommunications network having a plurality of service execution platforms each of which is associated with a service management system.

FIG. 3 illustrates a known system for managing services using a plurality of service execution platforms in a telecommunications network. Service execution platforms 1a, 1b, 1c are used each of which supports a variety of different services. A business customer has to provide a call plan 20, 21, 22 for each of the service managers 17, 18, 19. The business customer generates each call plan using an editor and interface provided by each of the respective equipment manufacturers. This of course carries overheads for the business user in learning to use and operate three differing interfaces. Also there are overheads incurred in duplication of parts of call plans for each platform. The business user will receive three reports of performance which will not be integrated to give an overall view of performance.

In order to allow call plans to use a service provided by one service execution platform and which is not supported by another, a business customer has to artificially (i.e. conceptually) divide the call answering centres 8, 7, 9, 11 into a plurality of virtual networks 14, 15, 16 such that each call plan 20, 21, 22 causes calls to be routed to an answering centre in a single one of the virtual networks. For example, in the simplified network of FIG. 3 the call plans could be designed such that call plan A 20 causes calls to be routed to an answering centre 11 in virtual network 14, call plan B 21 causes calls to be routed to answering centre 8 in virtual network 16 and call plan C 22 cause calls to be routed to answering centres 7, 9 in virtual network 15. It will be appreciated that in a real more complicated network each virtual network would comprise tens or hundreds of answering centres.

However, in this prior art system it is very difficult to provide a service using a combination of services supported by a plurality of service execution platforms. Problems occur if, for example using the call plan illustrated in FIG. 2, day of week routing is supported only by service execution platform A 1a, and proportional distribution is supported only by service execution platform B 1b and service execution platform C 1c.

Figure 4:
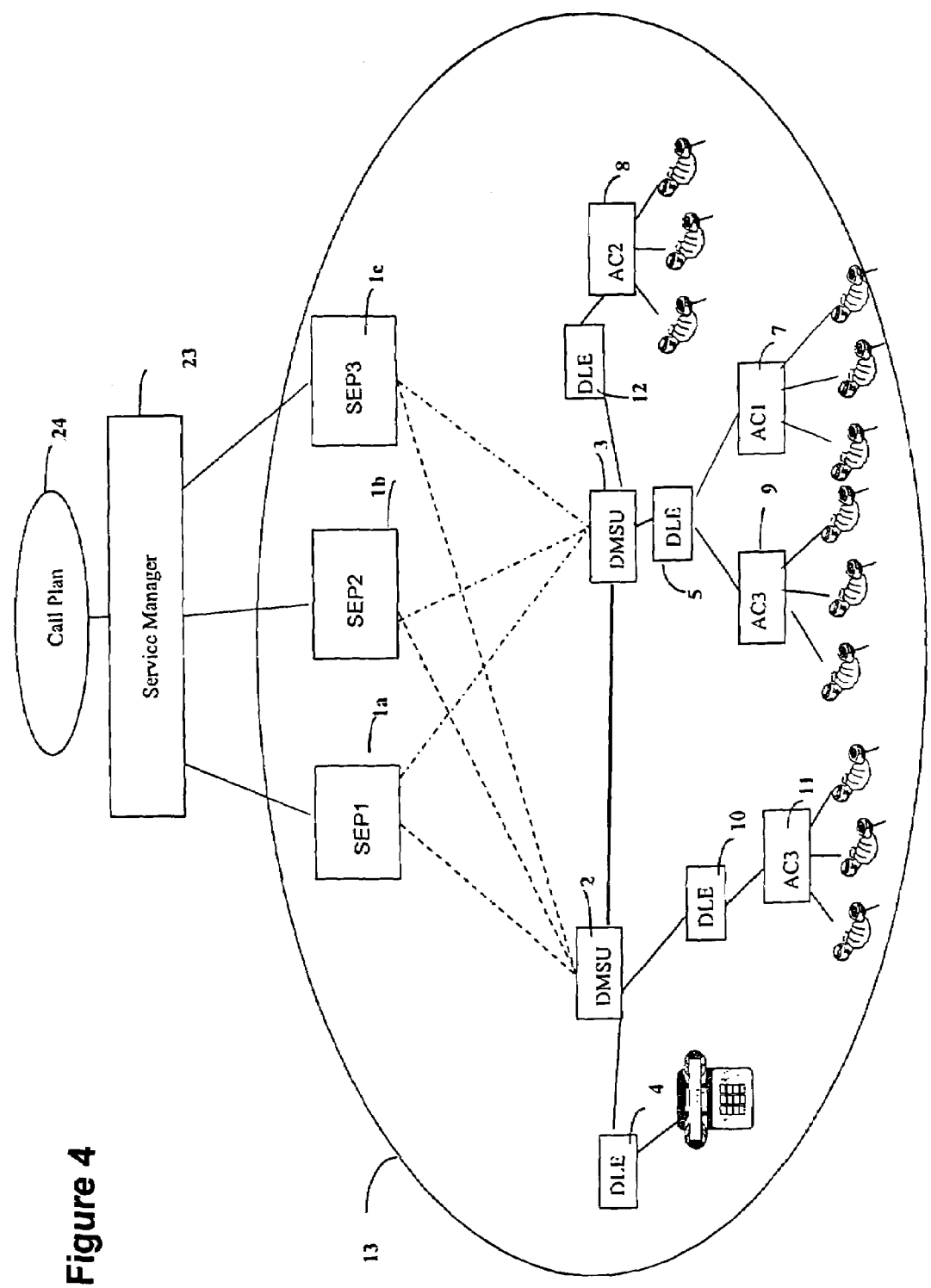
FIG. 4 illustrates a telecommunications network having a plurality of service execution platforms associated with a single service management system.

FIG. 4 illustrates a service management system according to an exemplary embodiment of the present invention. A single call plan 24 is used which may use services which are supported by a plurality of service execution platforms 1a, 1b and 1c. A single interface is used by the business customer. The service management system generates call plans according to rules which indicate which platform supports which services, and which also indicate which endpoints are associated with which platform. Although the endpoints are still associated with a particular platform, as for the example shown in FIG. 3, this is invisible to the user because by using the service manager of this invention the user can access any of the endpoints using the service manager of this invention the user can access any of the endpoints using any of the services available on any of the service execution platforms.

An example of these rules, is shown in tabular form in FIG. 5a. In this case FIG. 5b (referring back to FIG. 2) shows that day of week routing 30 is available only on service execution platform A 1a. Proportional distribution is available on service execution platform B 1b and also on service execution platform C 1c. Answering Centre x 34 and Answering Centre y 35 are associated with platform B 1b. Answering Point 32 is associated with platform A 1a.

The service manager 23 operates using an algorithm as shown in the flow charts of FIGS. 9 and 10, which will now be described with reference also to FIGS. 5, 6 and 7.

Figure 9:
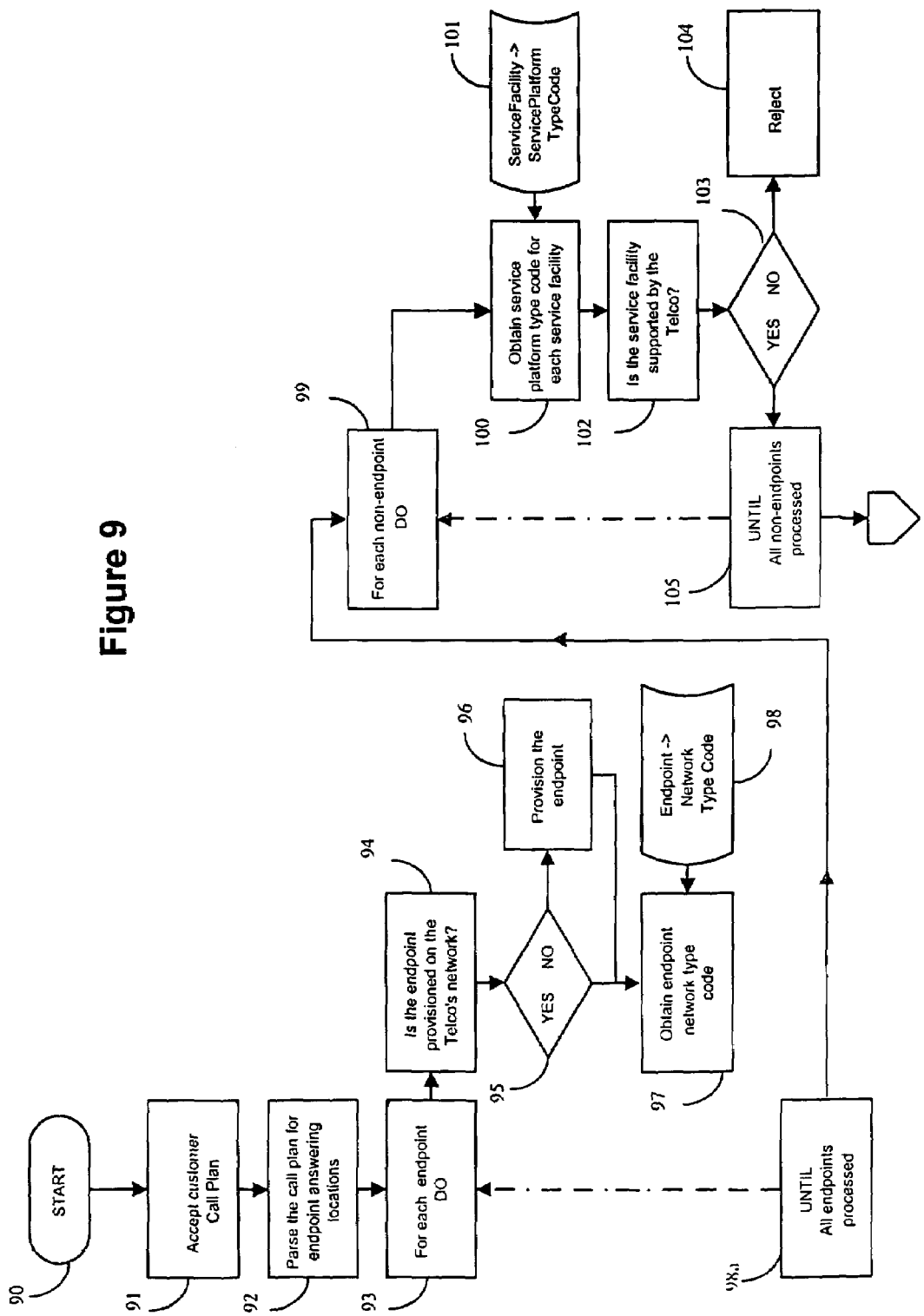
FIG. 9 and FIG. 10 are flow charts illustrating the operation of a method according to this invention.

FIG. 9 is a flow chart showing the process carried out by the service manager 23 in order to determine whether the service execution platforms available are able to support a customer call plan. At step 91 the call plan is transferred to the service manager 23. At step 92 the service manager parses the call plan to identify all the endpoints required by that call plan. Then, for each endpoint, at steps 94 and 95 the service manager 23 checks whether the endpoint is an answering location already provided and being billed on the Telecommunications Operator's network. If not then the endpoint is provided as required at step 96. At step 97 rules 98 determining which endpoints are associated with which network type (e.g. TDM or VoIP) are consulted, the network type being associated with a particular service execution platform, to determine which service execution platforms are going to be required to implement the call plan. Steps 94 to 98 are repeated until at step 98a it is determined that all the endpoints required by the call plan have been considered.

For each non-endpoint node at step 99 the call plan is parsed to determine which services are required for the particular node under consideration. At step 100 rules 101 are consulted to determine which service execution platforms may provide those services. If at step 102 and 103 it is discovered that none of the service execution platforms available can support the services requested then the call plan is rejected at step 104. Steps 100 to 104 are repeated until at step 105 it is determined that all the non-endpoint nodes required by the call plan have been considered.

Figure 5:
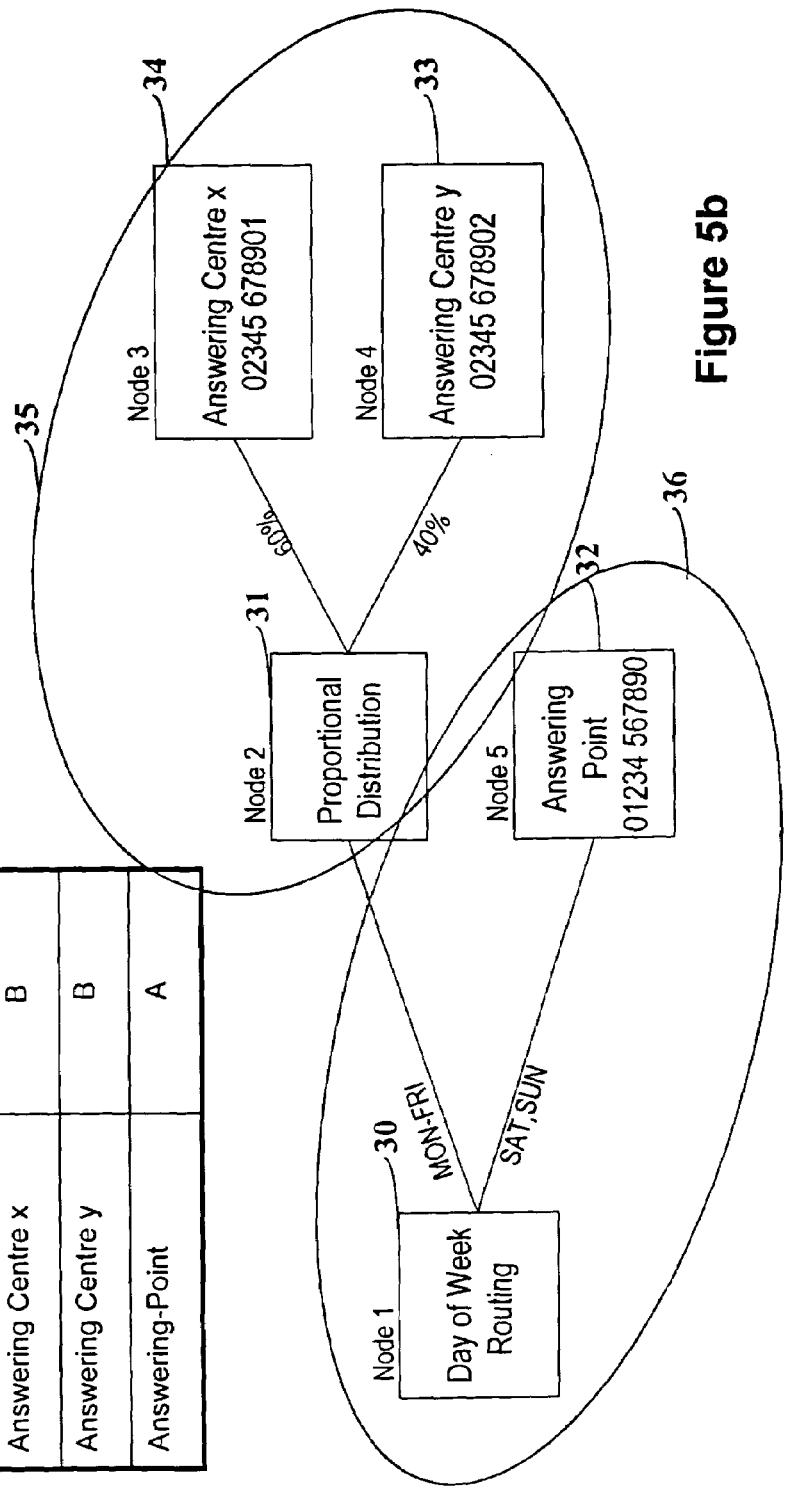
FIG. 5 illustrates a call plan which has been partitioned into call plan segments.
Figure 6:
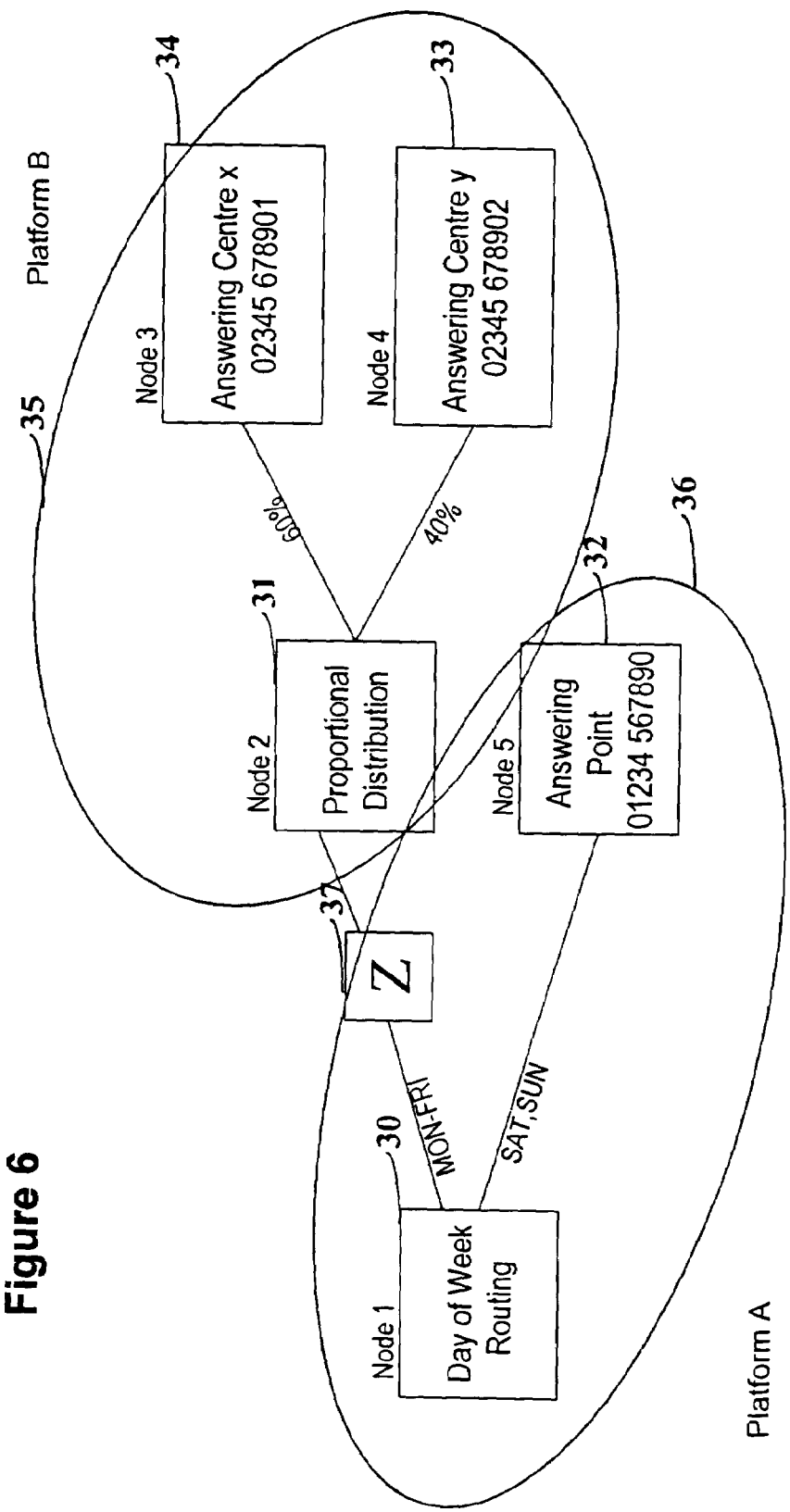
FIG. 6 illustrates the call plan of FIG. 5 with an additional interplatform routing node.
Figure 10:
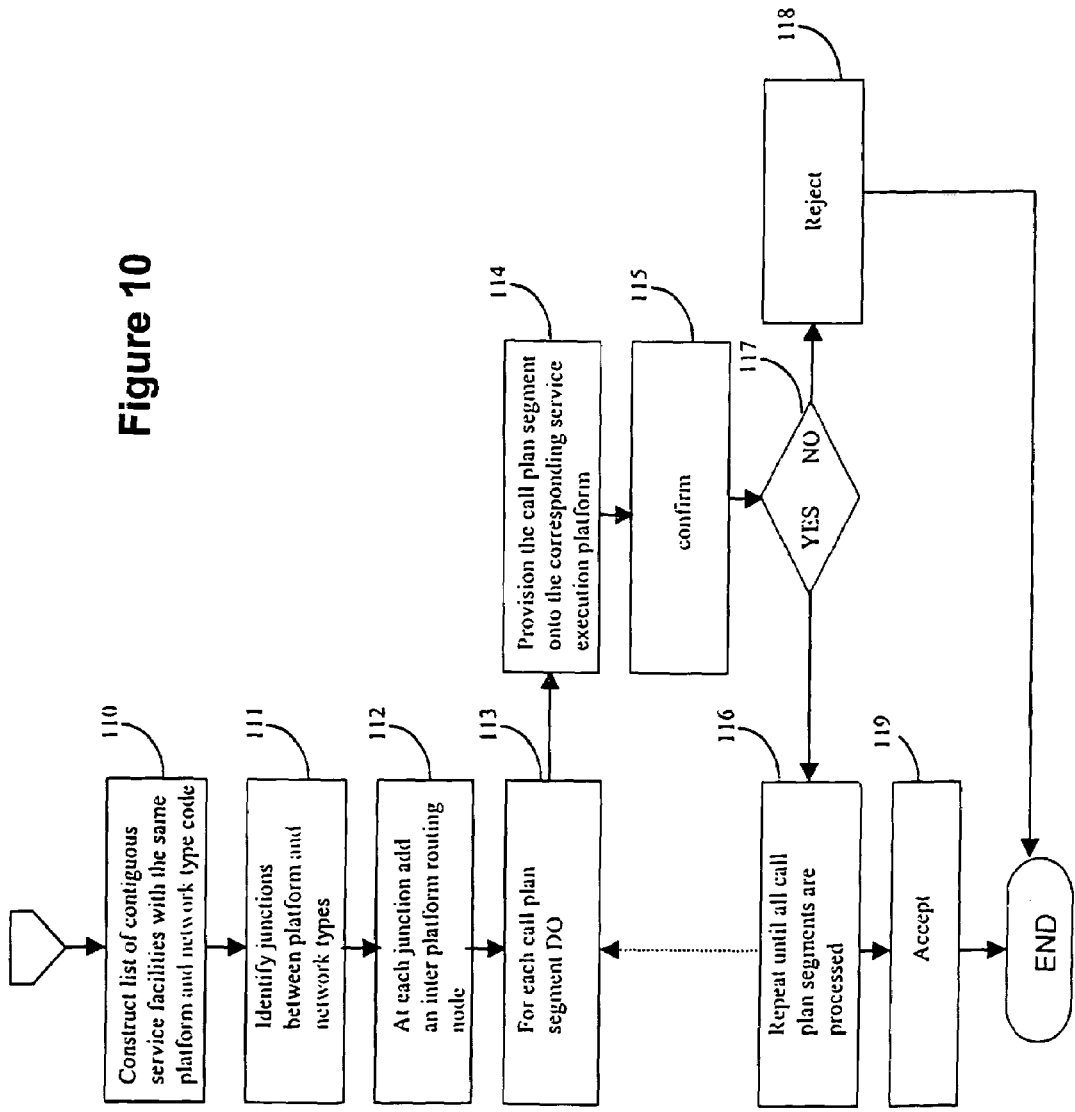

If the call plan is able to be implemented using the available service execution platforms then the call plan is implemented as shown in the flow chart of FIG. 10, and illustrated in FIGS. 5, 6 and 7.

At step 110 groups of contiguous service facilities which are supported on a particular service execution platform are constructed. For example, referring to FIG. 5, day of week routing node 30 and answering point 32 are associated with service execution platform A, proportional distribution node 31, answering centre x 34 and answering centre y 33 are supported by service execution platform B. Therefore it is possible to divide these nodes into two call plan segments as illustrated in FIG. 5b and indicated by reference numerals 35 and 36. At step 111 junctions between call plan segments are identified, and at step 112 inter platform routing nodes are added to the call plan. This process is illustrated in FIG. 6 which illustrates the insertion of an interplatform node Z 37 between call plan segment 35 and call plan segment 36. A new non-geographic number is used which acts as an endpoint as far as service execution platform A is concerned. This new non-geographic number is handled by service execution platform B as illustrated in FIG. 7. In this example the number which is dialed by the users is 0800 121212. The call is handled by platform A. If the call is received between Monday and Friday then the call is routed to 'endpoint' 0800 232323 which is in fact another non geographic number handled in turn by platform B, which supports proportional routing and routes the call as required. At steps 113 to 116 the call plan segments are provisioned onto the service execution platforms as required. So in the above example (referring to FIG. 7) the call plan segment shown in FIG. 7a will be provisioned onto service execution platform A and the call plan segment shown in FIG. 7b will be provisioned onto service execution platform B. A check for provision failure at step 114 (E.g. due to Power failure, faulty software, communications failure, sabotage, telco systems and switch failures) means that the customer call plan will be rejected in its entirety, rather than providing a part of the call plan which might leave the network in an undefined state.

FIG. 8 illustrates a consolidated report provided by the service manager 23 using the example described above. FIG. 8a illustrates a report received from platforms A and FIG. 8b illustrates a report received from platform B. FIG. 8c illustrates a consolidation of these two reports. The effective call total is the total 25 number of call received on platform A. The lost call total is the sum of the lost call on both platforms. It will be appreciated this is a very simple example and consolidation of a real call plan have many call plan segments will be much more complicated, although the principle will remain the same.

Although this description has been written with reference to a business customer it will be appreciated that an individual may ultimately be able to use services of supported by an intelligent network, for example to route numbers according to a personal call plan.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A service management system for implementing a call plan using a plurality of service facilities suitable for use in a communications network, said service management system comprising:

means for storing a plurality of rules describing how a plurality of service facilities maps on to a plurality of service execution platforms;

a processor for partitioning a call plan into a plurality of call plan segments in dependence upon said rules, each call plan segment using service facilities supported by a single service execution platform;

means for adding an interplatform routing node in between said call plan segments, the routing node causing transfer of call processing from one service execution platform to another service execution platform; and means for transferring the call plan segments to the service execution platform upon which those facilities are supported.

2. A service management system as in claim 1 in which the interplatform routing node causes a call to be forwarded from a first service execution platform to a non-geographic number associated with a second service execution platform.

3. A service management system as in claim 1 further comprising a report manager for providing a consolidated report relating to call statistics for a plurality of service execution platforms.

4. A method of partitioning a call plan into call plan segments in which a call plan comprises a plurality of service facilities, resulting in an incoming call being routed to one of a plurality of endpoints, and in which each service facility is associated with a service execution platform, and in which each endpoint is associated with a service execution platform; the method comprising:

constructing a plurality of call plan segments comprising contiguous service facilities associated with each particular service execution platform;

automatically providing an interplatform routing node between each pair of contiguous service execution facilities where one service facility of such a pair is associated with a first service execution platform and the other service facility of that pair is associated with a second service execution platform; and providing an interplatform routing node between each service facility associated with a first platform which routes the call to an endpoint associated with a second platform node.

5. A method as in claim 4, in which the interplatform routing node causes call processing to be forwarded from a first service execution platform to a non-geographic number associated with a second service execution platform.

6. A method of call distribution comprising:

receiving a call;

partitioning a call servicing plan for said received call into plural call plan segments, each segment being executable on a different respective execution platform;

routing the call according to a call plan segment associated with a first service execution platform;

forwarding the call to a second service execution platform via an inter-platform routing node inserted between call plan segments during said partitioning step to cause transfer of call processing from said first service execution platform to said second service execution platform; and routing the call according to a second call plan segment associated with the second service execution platform.

* * * * *